(12) United States Patent
Schaede et al.

(10) Patent No.: US 12,341,403 B2
(45) Date of Patent: Jun. 24, 2025

(54) INTEGRATED STATOR DEVICE FOR AN ELECTRIC MACHINE OF A FLYWHEEL ENERGY STORAGE SYSTEM

(71) Applicant: Adaptive Balancing Power GmbH, Pfungstadt (DE)

(72) Inventors: Hendrik Schaede, Darmstadt (DE); Nicolai Meder, Darmstadt (DE)

(73) Assignee: Adaptive Balancing Power GmbH, Pfungstadt (DE)

( * ) Notice: Subject to any disclaimer, the term of this patent is extended or adjusted under 35 U.S.C. 154(b) by 77 days.

(21) Appl. No.: 18/003,538

(22) PCT Filed: Jun. 21, 2021

(86) PCT No.: PCT/EP2021/066821
§ 371 (c)(1),
(2) Date: Dec. 29, 2022

(87) PCT Pub. No.: WO2022/002667
PCT Pub. Date: Jan. 6, 2022

(65) Prior Publication Data
US 2023/0253856 A1    Aug. 10, 2023

(30) Foreign Application Priority Data
Jun. 30, 2020   (DE) .................. 10 2020 208 153.0

(51) Int. Cl.
*H02K 1/20* (2006.01)
*H02K 7/02* (2006.01)
*H02K 11/01* (2016.01)

(52) U.S. Cl.
CPC .............. *H02K 7/025* (2013.01); *H02K 1/20* (2013.01); *H02K 11/014* (2020.08)

(58) Field of Classification Search
CPC .... H02K 1/187; H02K 1/2706; H02K 1/2713; H02K 1/272; H02K 1/2726;
(Continued)

(56) References Cited

U.S. PATENT DOCUMENTS 5,705,866 A * 1/1998 Oguchi .................. H02K 1/187
310/90
6,794,776 B1 * 9/2004 Gabrys .................. H02K 7/025
310/90.5
(Continued)

FOREIGN PATENT DOCUMENTS

CN    109450158 A * 3/2019 ............. H02K 7/025

OTHER PUBLICATIONS

Zhao et al., Machine Translation of CN109450158, Mar. 2019 (Year: 2019).*

*Primary Examiner* — Eric Johnson
(74) *Attorney, Agent, or Firm* — Michael J. Feigin, Esq.; Feigin and Fridman LLC

(57) ABSTRACT

The invention relates to a stator device (1) for an electric machine of a flywheel mass accumulator device, having a laminating unit (2), having a winding (5) and at least two vacuum-side motor phase connection cables (6) connected to the winding (5), having a cylindrical sleeve unit (3), on the outer lateral surface (3a) of which the laminating unit (2) is arranged, and having a sealing unit (7), which is arranged on an inner circumferential surface (3b) of the sleeve unit (3) and which is designed to connect the vacuum-side motor phase connection cables (6) in each case in a vacuum-tight manner to a respective circumferential-side motor phase connection cable (6'), in order to provide a stator device (1), which is improved in terms is of its installation space requirement, for an electric machine of a flywheel mass accumulator device.

10 Claims, 1 Drawing Sheet

Figure 1:
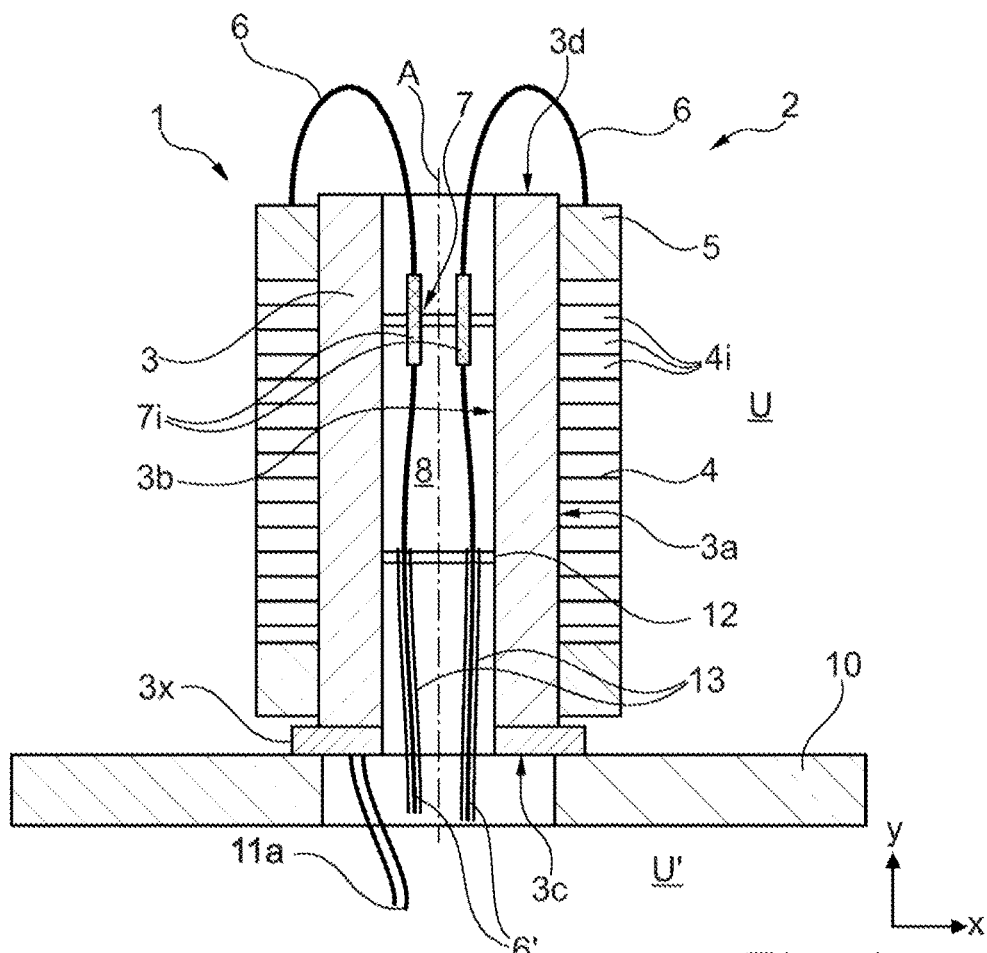

(58) Field of Classification Search
CPC .... H02K 1/2733; H02K 1/274; H02K 1/2746; H02K 1/2753; H02K 1/276; H02K 1/2766; H02K 1/2773; H02K 1/278; H02K 1/2781; H02K 1/2783; H02K 1/20; H02K 5/20; H02K 5/203; H02K 5/22; H02K 5/225; H02K 7/02; H02K 7/025; H02K 21/22–225

See application file for complete search history.

(56) References Cited

U.S. PATENT DOCUMENTS

| | | | | |
|---|---|---|---|---|
| 7,474,021 B2* | 1/2009 | Perrin | .................... | H02K 9/227 |
| | | | | 310/58 |
| 2003/0156954 A1* | 8/2003 | Kimura | .............. | H01R 13/6592 |
| | | | | 417/410.5 |

* cited by examiner

INTEGRATED STATOR DEVICE FOR AN ELECTRIC MACHINE OF A FLYWHEEL ENERGY STORAGE SYSTEM

The invention relates to a stator device for an electric machine of a flywheel mass accumulator or mass storage unit, in particular of a motor-generator unit of a flywheel mass accumulator unit, with a laminated or sheeting unit which has a winding and at least two vacuum-side motor phase connection cables connected to the winding, and with a cylindrical sleeve unit, on the outer circumferential surface of which the laminated unit is arranged.

In addition to the laminations and windings, which are part of a laminating unit, stator devices or stators of electrical machines also consist of a sleeve-shaped body, a sleeve unit, which supports the laminations. The sleeve unit is usually metallic, for example made of aluminum or steel. Its function is to preset the geometric position of the sheeting unit and to transmit a mechanical moment of the electric machine to an external structure associated with the stator device. Moreover, the sleeve unit also dissipates heat resulting from stator losses. Therefore, in high power density electric machines, the sleeve unit is often cooled with a fluid. A cooling spiral is often used for this purpose, by means of which a cooling fluid is fed spirally into a gap between a circumferential surface (shell surface) of the sleeve unit and the associated structure.

In such electrical machines, which are designed as internal rotors (inside runners), the sheet metal is correspondingly inserted into the sleeve unit, and the sleeve unit is again inserted into a suitable bore of the structure. When the electric machine is used as intended, the cooling fluid is then located in the gap between the sleeve and the bore, which is why the sleeve unit and bore are sealed accordingly at two axially opposite end faces, usually with ordinary O-rings. The relative geometric position of the units with respect to each other is determined via corresponding mating surfaces. For example, the sleeve unit can be bolted to the structure via a flange so that the torque is transmitted. Such implementations are widely used, for example, in machine tool spindles or also in the drive systems of electric vehicles.

In the field of electrical machines of flywheel mass accumulator systems, in which an electrical energy is converted into a rotational energy of the flywheel mass of the flywheel mass accumulator system and stored in order to be converted back into electrical energy when required, the electrical machines used are partly designed as external rotors (outside runners). Since in an external rotor the stator device is located inside a rotor device, there is significantly less installation space available in this case than in an internal rotor. Accordingly, there is also less surface area available for cooling. At the same time, it should be noted that the rotor units of flywheel mass accumulator systems are operated in a vacuum. If a cooling fluid leaks into an evacuated area there, the cooling fluid evaporates and the pressure level in the flywheel mass accumulator unit rises sharply, which can damage the flywheel mass accumulator unit. In the event of an unforeseen system condition resulting in damage to the cooling system, the entry of cooling fluid into the evacuated area can thus cause serious damage to the overall system. For this reason, sealing of the cooling system against the evacuated area must function particularly reliably in the case of flywheel mass accumulator systems, and is therefore generally more complex, i.e. more expensive and/or requires more space.

Another factor is that in the case of flywheel mass accumulator units with higher power, the motor phase connection cables, via which the electrical power is transmitted, are of large cross-section. Accordingly, the motor phase connection cables require a particularly large amount of space both in the evacuated area and in an ambient area under atmospheric pressure. The motor phase connection cables must be routed from the winding, which is located in the evacuated area, to the outside of the stator device via a hermetically sealed bushing in the ambient area under atmospheric pressure. Such a hermetic feedthrough (bushing) also has an increased space requirement. In addition, electromagnetic compatibility must be ensured due to the pulsed voltages applied to the motor phases, i.e. the motor phase connection cables must be adequately shielded.

The invention is thus based on the task of providing a stator device for an electric machine of a flywheel mass accumulator which is improved with respect to its installation space requirement.

This task is solved by the objects of the independent patent claims. Advantageous embodiments result from the dependent patent claims, the description and the figures.

One aspect relates to a stator device for an electric machine of a flywheel mass accumulator device, comprising a laminations unit (laminating unit) and a cylindrical sleeve unit. The laminations unit comprises a lamination stack having at least one winding wound around the laminations stack areawise and/or sectionally and at least two, that is two or more than two, preferably three and more, for example five or six, vacuum-side motor phase connection cables connected to the winding. By "vacuum-side" it is preferably meant here that the corresponding motor phase connection cables are arranged in an evacuated ambient area (evacuted surrounding area) of the stator device when the stator device is used as intended in the electric machine of the flywheel mass accumulator device during operation of the flywheel mass accumulator device. It may also be provided, for example, that the vacuum-side motor phase connection cables are potted with a potting resin, for example together with one or more parts of the stator device. In this case, "vacuum-side" may be understood to mean that the corresponding motor phase connection cables face a side of the stator device facing the evacuated ambient area when the stator device is used as intended in the electric machine of the flywheel mass accumulator during operation of the flywheel mass accumulator. At this point it is also to be noted that in the evacuated surrounding area of the stator device, in which the flywheel masses are arranged during operation of the stator device, instead of a vacuum also a gas mixture with a pressure can be contained in comparison to the non-evacuated or less evacuated outer area described below. With reference to the term "sectionally", a section may herein refer to a section in an axial direction of the electric machine. An area associated with the term "areawise" may refer to any area oriented freely in space. In this context, the stator device may be designed in particular for an electric machine designed as an external rotor (outside runner). The laminating unit is arranged on an outer circumferential surface of the cylindrical sleeve unit.

The stator device also has a sealing unit which is arranged on an inner circumferential surface (an inner lateral surface) of the sleeve unit and which is designed to connect the vacuum-side motor phase connection cables connected to the winding in a vacuum-tight manner to a respective environenmental-side motor phase connection cable. The respective environenmental-side motor phase connection cables are arranged, during intended use of the stator device and thus of the flywheel mass accumulator device, in an ambient area of the stator device (and of the flywheel mass accumulator device) which is not evacuated, is preferably under atmospheric pressure, or is at least less evacuated than the ambient area in which the vacuum-side motor phase connection cables are arranged.

The sealing unit thus separates in particular that part of the surface of the cylindrical sleeve unit which, during intended use of the stator device in the flywheel mass accumulator unit, is adjacent to a vacuum from that part of the surface of the cylindrical sleeve unit which is adjacent to the ambient area under atmospheric pressure. The sealing unit and, at least in part, the cylindrical sleeve unit thus serve to separate the evacuated region from the atmosphere. In an outer space of the cylindrical sleeve unit, to which the outer circumferential surface of the cylindrical sleeve unit faces, a vacuum prevails during operation of the flywheel mass accumulator, and in a cylindrical inner space of the cylindrical sleeve unit, through which a central axis of the cylindrical sleeve unit preferably runs, a vacuum and/or atmospheric pressure can exist at least sectionally.

As will be explained further below, the sealing unit can also be created, for example, by the cylindrical sleeve unit having a blind hole extending in the axial direction on at least one end face, the bottom of which is then part of the sealing unit. Here, if the cylindrical sleeve unit has, for example, two blind holes formed with respective blind bores (one from each end face), the sealing unit is arranged in a central region of the cylindrical sleeve unit and adjoins the inner circumferential surface of the sleeve unit on both sides with the bottoms of the blind holes and is thus arranged thereon. In the case of blind holes formed with blind bores, the sealing unit is at least partially made in one piece with the sleeve unit. If there is only one blind hole, for example only one blind hole, from one end face, the sealing unit is arranged on the end region of the cylindrical sleeve unit opposite this end face, i.e. the other end face, and merges into the end face of the sleeve unit on one side and into the inner circumferential surface on the other side, so is likewise arranged on the inner circumferential surface. The blind hole or holes can also be formed with (i.e. here with the aid of) a through hole (for example a through bore) in which the sealing unit is arranged as a separate unit. Then, only when the separate sealing unit is installed the corresponding blind hole(s) is formed. Thus, a blind hole in the context of the present disclosure may also denote an ordinary through hole which is closed in an end or middle portion (by the sealing unit).

This has the advantage that the space requirement of the stator device is reduced in the axial direction, since the sealing unit and thus the hermetic feedthrough is not realized in axial extension of the stator, but inside the sleeve unit, which saves space. Moreover, sealing surfaces between the evacuated area and the atmospheric environment are thus rendered superfluous, since the cylindrical sleeve unit has to be sealed against the environment anyway, which now coincides with the sealing for the hermetic feedthrough.

Accordingly, in an advantageous embodiment, it is provided that the sealing unit is arranged at least partially, i.e. partially or completely, in the cylinder interior. The cylinder interior extends along a central axis of the cylindrical sleeve unit, wherein the central axis may both extend through the cylinder interior or pass laterally past the cylinder interior. The central axis of the cylindrical sleeve unit may be a central axis of rotation for a rotor of the electric machine. In particular, the cylinder interior may be parallel or substantially parallel to the central axis. Here, "substantially" may mean "except for a predetermined deviation", where the deviation may be, for example, 1°, 15° or 30°. In particular, the sealing unit may be arranged in such a way that respective connecting elements of the vacuum-side motor phase connecting cables, i.e., cable-side connecting elements, and/or respective connecting elements for the vacuum-side motor phase connecting cables, i.e., sealing unit-side connecting elements, are also (preferably completely) arranged in the cylinder interior of the cylindrical sleeve unit. This has the advantage that the respective connection elements do not protrude from the cylindrical sleeve unit, thus ensuring on the one hand that the axial space requirement of the stator device is minimized, and on the other hand also optimizing the electrical shielding of the motor phase connection cables by the sleeve unit.

In a particularly advantageous embodiment, it can be provided that the sealing unit is at least partially, i.e. partly or entirely, formed integrally with the sleeve unit or at least a part of the sleeve unit, for example a sub-unit of the sleeve unit. This has the advantage that sealing surfaces between the evacuated area and atmospheric pressure are again saved.

In a further advantageous embodiment, it is provided that the sleeve unit has at least one fluid channel for passing a cooling fluid through the sleeve unit. This is particularly advantageous in that, in addition to the laminating unit (sheet metal unit), the heat-generating motor phase connection cables are also actively cooled.

In this context, it is advantageously provided that the fluid channel exclusively has sealing elements with which it is sealed off from an external space, which do not adjoin an evacuated ambient area in the flywheel mass accumulator unit, for example a vacuum of the flywheel mass accumulator unit, when the stator device is used as intended. This prevents by design the cooling fluid from flowing into the evacuated area of the flywheel mass accumulator device in the event of an unforeseen operating condition, in particular in the event of a failure of the sealing elements. This also saves installation space, as the corresponding sealing elements can be designed more simply.

In an advantageous embodiment, it can be provided that the fluid channel has blind holes, in particular blind bores, which are fluidically coupled to one another. In particular, the fluid channel may comprise the blind holes at least in sections (sectionally), preferably in a continuous section. The blind holes thereby preferably extend from a side, for example a (first) end face of the sleeve unit, into the body of the sleeve unit, which side is adjacent to an ambient area/region with atmospheric pressure or a less pronounced vacuum than the ambient area/region with the rotor unit of the electric machine and/or the flywheel mass accumulator during intended use of the stator device and thus during operation of the flywheel mass accumulator. The blind holes thereby preferably run at least partially transversely, i.e. not parallel, to one another, i.e. in such a way that they meet another blind hole at a respective end region and merge into it there. In particular, each blind hole can run parallel to at least one next but one neighbor. Particularly preferably, the blind holes also merge into one another in an initial region adjacent to the (first) end face, so that, with sealing of the (first) end face by means of corresponding sealing elements, the respective initial regions of the blind holes can be sealed off from the environment (the outer region of the fluid channel) without being sealed off from the other blind hole. Thus, a continuous fluid channel consisting of the blind holes can be created. This has the advantage that seals only have to be provided on one side, the first end face of the cylindrical sleeve unit, and it is thus particularly easy to prevent sealing surfaces of the fluid channel from being adjacent to a vacuum of the flywheel mass accumulator. This places fewer requirements on the sealing elements than on sealing elements that have to seal a fluid channel against an evacuated area.

It can thus be provided that the blind holes extend from the first end face, an environment-side end face, of the cylindrical sleeve unit into the cylindrical body of the cylindrical sleeve unit and are fluidically coupled to one another in the region of the first end face and a second end face, a vacuum-side end face, axially opposite the first end face, in particular at the first end face at least partially, preferably all blind holes except for two blind holes, which serve as connections of the fluid channel, have respective sealing elements which seal the fluid channel with respect to an ambient area with atmospheric pressure or at least with a less pronounced vacuum than the evacuated area with the rotor unit of the flywheel mass accumulator. The fluidic coupling can be created by a merging of the blind holes in the corresponding initial or end regions of the blind holes. In contrast, in a central region lying between the initial and end regions, there is preferably no direct fluidic coupling between the different blind holes, i.e. they preferably do not merge into one another there. The advantage of this is that the fluid channel has no sealing surface with respect to the evacuated area, and the blind holes also provide extremely space-saving cooling.

In another advantageous embodiment, it is provided that a shielding unit is arranged in the cylinder interior of the sleeve unit on the environment-side motor phase connection cables, which is electrically coupled to an electrical shielding of the environment-side motor phase connection cables and/or protects the sealing unit from mechanical contact on its ambient-side side. This has the advantage that electromagnetic compatibility is ensured and the sleeve unit can be used as a shielding support, whereby the multiple function of the sleeve unit thus realized in turn saves installation space.

Another aspect also relates to an electric machine, in particular an electric machine of a motor-generator unit, for a flywheel mass accumulator, comprising a stator device according to one of the described embodiments. The electric machine also has a corresponding rotor device having a rotor. Accordingly, an aspect also includes a flywheel mass accumulator device having such an electric machine.

Another aspect relates to a method of manufacturing a stator device for an electric machine of a flywheel mass accumulator device, the stator device comprising a laminated unit having a winding and at least two vacuum-side motor phase connection cables connected to the winding, and a cylindrical sleeve unit having the laminated unit arranged on an outer circumferential surface thereof. The method comprises at least the step of drilling at least one blind hole along a central axis of a cylinder unit in the cylinder unit such that a bottom of the blind hole is usable, when using the cylinder unit as a cylindrical sleeve unit, as part of a sealing unit (or as the sealing unit) adapted to vacuum-tightly connect each of the vacuum-side motor phase connection cables to a respective surrounding-side motor phase connection cable. Thus, the blind hole inner wall forms a portion of an inner circumferential surface or the inner circumferential surface of the sleeve unit, and the sealing unit with the bottom of the blind hole is arranged on the inner circumferential surface, that is, the remaining blind hole inner wall. As an alternative to drilling, the blind hole(s) can also be produced by other methods, for example by drilling through and subsequently inserting the sealing unit, or by using a hollow pressed profile for the sleeve unit, also with subsequent insertion of the sealing unit. Overall, therefore, the aspect relates to any manufacturing process for any of the described embodiments of the stator device.

Advantages and advantageous embodiments of the method correspond here to advantages and advantageous embodiments of the described stator device and vice versa.

The features and combinations of features mentioned above in the description, also in the introductory part, as well as the features and combinations of features mentioned below in the description of the figures and/or shown alone in the figures are usable not only in the respective combination indicated, but also in other combinations without leaving the scope of the invention. Thus, embodiments are also to be regarded as encompassed and disclosed by the invention which are not explicitly shown and explained in the figures, but which arise from the explained embodiments and can be generated by separate combinations of features. Embodiments and combinations of features are also to be regarded as disclosed which thus do not have all the features of an originally formulated independent claim. Furthermore, embodiments and combinations of features are to be regarded as disclosed, in particular by the embodiments set forth above, which go beyond or deviate from the combinations of features set forth in the recitations of the claims.

With the aid of the following figures, the object of the invention will be explained in more detail, without wishing to limit it to the specific embodiments shown here.

Figure 2:
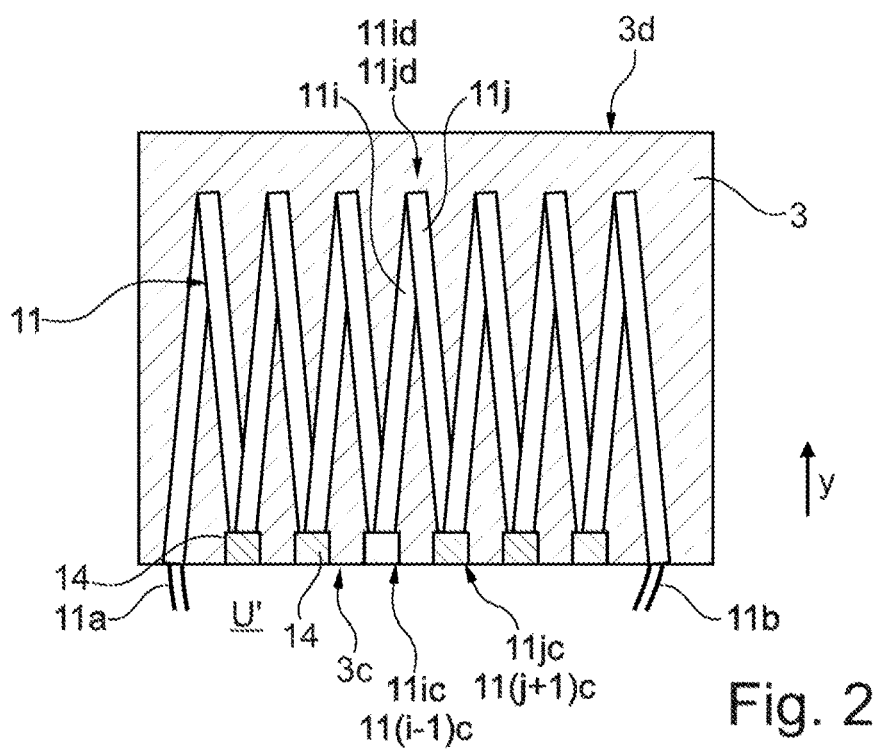

Thereby shows:

FIG. 1 a schematic sectional view through an exemplary embodiment of a stator device; and FIG. 2 a sectional view through the unwound sleeve unit of FIG. 1.

Identical and functionally identical elements are given the same reference signs in the figures.

FIG. 1 shows a schematic sectional view of an exemplary embodiment of a stator device in an x-y plane. The stator device 1 is intended for an electric machine of a flywheel mass accumulator. It has a laminating unit 2 and a cylindrical sleeve unit 3. The laminating unit 2 comprises a laminated core 4 with a plurality of laminations 4$i$ as well as a winding and the winding heads 5 with at least two vacuum-side motor phase connection cables 6 connected to the winding. The laminating unit 2 is arranged on an outer circumferential surface 3$a$ of the cylindrical sleeve unit 3 facing away from a central axis A.

The stator device 1 also comprises a sealing unit 7, which is arranged on an inner circumferential surface 3$b$ of the sleeve unit 3 facing the central axis A, and which is designed to connect the vacuum-side motor phase connection cables 6 each in a vacuum-tight manner to a respective associated environment-side motor phase connection cable 6'.

The stator device 1 is thus partially surrounded by an ambient area U which is evacuated during operation of the flywheel mass accumulator, but at least part of the inner circumferential surface 3$b$ is adjacent to an environment U' in which there is a higher pressure than in the evacuated ambient area U, typically the usual atmospheric pressure. The sealing unit 7 adjoins the ambient area U on the vacuum side and the environment U' on the atmospheric side.

In the embodiment shown, the sealing unit 7 is arranged completely in a cylinder interior 8 of the cylindrical sleeve unit 3, in this case in such a way that respective connection elements 7$i$ of the motor phase connection cables 6, 6' or for the motor phase connection cables 6, 6' are also arranged in the cylinder interior 8 of the cylindrical sleeve unit 3. The central axis A of the cylindrical sleeve unit 3 also runs through the cylinder interior 8, which also determines an axial direction of the stator device 1 and thus of the electric machine and also of the flywheel mass accumulator. Alternatively, the cylinder interior 8 can also be arranged off-center so that, for example, the central axis A does not run through it.

The stator device 1 is attached to an external structure 10 via a flange 3x of the sleeve unit 3. In the area of the flange 3x, a connection 11a for a fluid channel 11 (FIG. 2) is also arranged here on an environment-side, i.e. preferably atmospheric pressure-side, first end face 3c of the sleeve unit 3. In the example shown, a shielding unit 12 is also fitted in the cylinder interior 8, which in the present case is arranged not only on the environment-side motor phase connection cables 6', but also on the inner shell surface 3b. In addition, the shielding unit 12 also serves as a shielding support and is electrically coupled with an electrical shield 13 of the environment-side motor phase connection cables 6'.

FIG. 2 shows a sectional view through the unwound shell of the sleeve unit 3, i.e. the shell of the sleeve unit 3 converted into a two-dimensional form. The fluid channel 11 is formed completely in the body of the sleeve unit 3 by blind holes 11i, 11j, which are designed here as blind bores. For this purpose, the blind holes 11i, 11j are designed in such a way that in each case nearest neighbors run transversely, i.e. not parallel, but next but one neighbors run parallel, and thereby merge into one another in respectively assigned initial regions 11(i−1)c, 11ic, 11jc, 11(j+1)c, which are assigned to the first (environment-side or atmosphere-side) end face 3c of the sleeve unit 3, and in end regions 11id, 11jd, which are located in the region of the (vacuum-side) second end face 3d of the sleeve unit 3. Specifically, the blind hole 11(i−1) thus merges at the initial region 11(i−1)c into the initial region 11ic of the next blind hole 11i. The initial area of a respective blind hole 11i, 11j is in this case the area at which the blind hole 11i, 11j opens towards the environment U'. The end region 11id of the blind hole i then merges into the end region 11jd of the next blind hole 11j in the vicinity of the vacuum-side end face 3d. The end region 11id, 11jd is thereby the region in which a respective bottom of the associated blind hole 11i, 11j is located. The initial region 11jc of the fluid channel 11j then merges back into the initial region of the next blind hole 11(j+1)c in the region of the end face 3c, and so on. Since the next adjacent blind holes 11i, 11j are tilted relative to one another in at least one plane, and presently the next but one blind holes 11(i−1), 11j and 11i, 11(j+1) each run parallel to one another in at least one plane, the result after sealing of all initial regions 11(i−1)c, 11ic, 11jc, 11(j+1)c by means of corresponding sealing elements 14 is a continuous fluid channel 11, which can be supplied via two ports 11a, 11b, i.e. two unsealed blind holes, with a cooling fluid. The two blind holes, which are coupled with their respective initial area to the connections 11a, 11b, do not merge in their initial area into another blind hole, but advantageously exclusively into a respective associated end area.

The invention claimed is:

1. A stator device for an electric machine of a flywheel mass accumulator with a rotor unit operated in an evacuated ambient area, having:
   a laminating unit, having a winding and at least two vacuum-side motor phase connection cables connected to the winding;
   a cylindrical sleeve unit, on whose outer circumferential surface the laminating unit is arranged characterized by
   a sealing unit which is arranged on an inner circumferential surface of the sleeve unit and which is designed to connect the respective vacuum-side motor phase connection cables in a vacuum-tight manner to a respective environment-side motor phase connection cable, where the sealing unit is at least partially formed integrally with the sleeve unit or a sub-unit of the sleeve unit; and:
   at least a part of the inner circumferential surface of the cylindrical sleeve unit is adjacent to an atmospheric environment separating the evacuated ambient area from the atmosphere, such that at least in a section of a cylindrical inner space of the cylindrical sleeve unit, through which cylindrical inner space a central axis of the cylindrical sleeve unit runs, an atmospheric pressure exists during operation:
   the sleeve unit comprising at least one fluid channel for passing a cooling fluid through the sleeve unit.

2. The stator device of to claim 1, wherein the sealing unit is arranged in a cylinder interior of the cylindrical sleeve.

3. The stator device of The Stator device of claim 2, wherein respective connecting elements of the vacuum-side motor phase connecting cables and/or respective connecting elements of the environment-side motor phase connecting cables are also arranged in the cylinder interior of the cylindrical sleeve unit.

4. The stator device of claim 1, wherein the fluid channel exclusively comprises sealing elements which do not adjoin an evacuated ambient area in the flywheel mass accumulator when the stator device is used as intended.

5. The stator device of claim 1, wherein the fluid channel has blind holes or blind bores, which are fluidically coupled to one another.

6. The stator device of claim 5, wherein the blind holes or blind bores extend from a first end face of the cylindrical sleeve unit into the cylindrical body of the cylindrical sleeve unit and are fluidically coupled to one another in the region of the first end face and of a second end face axially opposite the first end face.

7. The stator device according to claim 6, wherein at the first end face at least partially have respective sealing elements which seal off the fluid channel with respect to an environment.

8. The stator device according to claim 5, wherein the fluid channel consists at least in sections of the blind holes or blind bores.

9. The stator device of claim 1, wherein a shielding unit is arranged in the cylinder interior of the sleeve unit at the environment-side motor phase connection cables, which shielding unit is electrically coupled to an electrical shielding of the environment-side motor phase connection cables and/or protects the sealing unit from a mechanical contact at the environment side thereof.

10. An electric machine for a flywheel mass accumulator, comprising
   a flywheel mass accumulator,
   a stator device and a rotor unit operated in an evacuated ambient area, having:
      a laminating unit, having a winding and at least two vacuum-side motor phase connection cables connected to the winding;
      a cylindrical sleeve unit, on whose outer circumferential surface the laminating unit is arranged characterized by
      a sealing unit which is arranged on an inner circumferential surface of the sleeve unit and which is designed to connect the respective vacuum-side motor phase connection cables in a vacuum-tight manner to a respective environment-side motor phase connection cable, where the sealing unit is at least partially formed integrally with the sleeve unit or a sub-unit of the sleeve unit; and:

at least a part of the inner circumferential surface of the cylindrical sleeve unit is adjacent to an atmospheric environment separating the evacuated ambient area from the atmosphere, such that at least in a section of a cylindrical inner space of the cylindrical sleeve unit, through which cylindrical inner space a central axis of the cylindrical sleeve unit runs, an atmospheric pressure exists during operation:

the sleeve unit comprising at least one fluid channel for passing a cooling fluid through the sleeve unit.

* * * * *